Jan. 16, 1968 C. A. HOLLINGSWORTH ET AL 3,364,008
METHOD OF DEFLUORINATING PHOSPHATE ROCK
IN A FLUIDIZED BED REACTOR
Filed March 19, 1965

INVENTORS
CLINTON A. HOLLINGSWORTH
JOHN H. SNYDER
BY
*Pennie, Edmonds, Morton, Taylor & Adams*
ATTORNEYS 3,364,008
METHOD OF DEFLUORINATING PHOSPHATE ROCK IN A FLUIDIZED BED REACTOR
Clinton A. Hollingsworth and John H. Snyder, Lakeland, Fla., assignors to The Borden Company, New York, N.Y., a corporation of New Jersey
Filed Mar. 19, 1965, Ser. No. 441,138
6 Claims. (Cl. 71—41)

ABSTRACT OF THE DISCLOSURE

Phosphate rock is defluorinated by mixing the rock which has particle size less than about 10 mesh (Tyler Standard) with phosphoric acid at a temperature below about 400° F. to cause partial reaction of the mixture and to form a non-agglomerated feed. The feed is then agglomerated in a fluidized bed preferably at a temperature above 2000° F. to effect defluorination. Alternatively, the fluidized bed is maintained at a temperature in the range between 1000° F. and 1300° F. for the agglomeration of the feed material and thereafter defluorinating the thus agglomerated feed material in a second fluidized bed at a temperature above about 2000° F.

---

Figure 1:
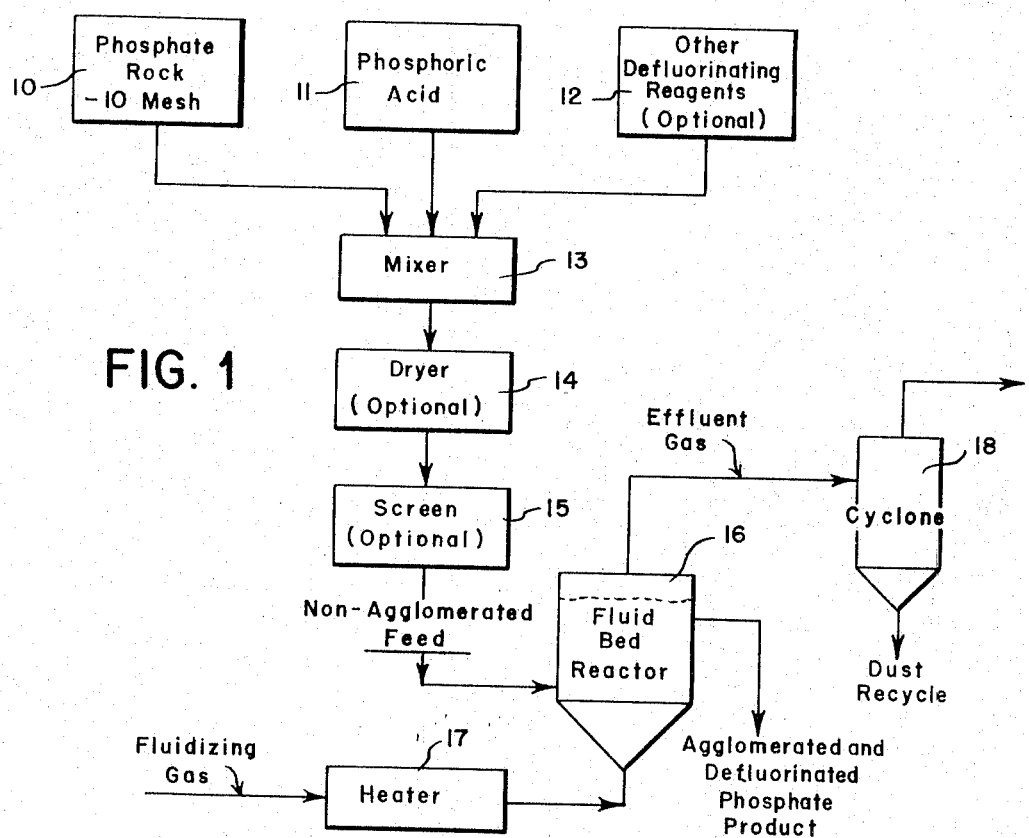

This invention relates to the defluorination of phosphate rock and similar natural phosphate materials in a fluid bed reactor.

Phosphate-containing materials are in great demand for use both as plant fertilizers and as animal feed supplements, and the market for such materials is constantly growing. The principal sources of phosphate are the great natural deposits of pebble rock and phosphate rock found in Florida and in the western states, and such widely distributed phosphatic materials as apatite. Unfortunately these naturally occurring phosphate materials contain combined fluorine in quantities which can, under certain conditions, interfere with the availability of the phosphate values when used as fertilizers and which are detrimental to health when used as animal feed supplements. As a result, when these phosphatic materials are to be used as fertilizers, and particularly when they are to be used as animal feed supplements, the phosphatic material is commonly treated to reduce the fluorine content of the material usually below a specified minimum amount, the fluorine content of an acceptable animal feed supplement being less than one part of fluorine per 100 parts of phosphorus by weight.

A great deal of effort has been devoted to the problem of developing economical and efficient processes for reducing the fluorine content of these phosphatic materials (herein collectively referred to as phosphate rock) to acceptable limits. Thermal processes have been the most widely known and commercially successful means of defluorinating phosphate rock. A typical thermal process involves calcining the phosphate rock in the presence of phosphoric acid, water vapor and other reagents at a temperature in excess of about 2200° F. to drive off a substantial portion of the fluorine content of the rock and thereby obtain a defluorinated phosphate product. The principal difficulty encountered in the defluorination of phosphate rock by high temperature calcination arises from the fact that the temperature required for the removal of fluorine is so high that objectionable fusion or sintering of the rock can take place before removal of fluorine to the desired extent is effected. In order to avoid the disruption of the calcination process due to partial fusion and the consequent formation of large lumps of phosphate feed material in the kiln or other calcining apparatus, it has heretofore been the practice to form the defluorination feed material into nodules or agglomerates having sufficient mechanical strength, porosity and resistance to fusion to withstand calcination in a rotary kiln, and a great deal of time and effort have been expended in developing methods for making such a nodulized feed material. The prior art practice of making nodulized defluorination feed material is exemplified by the processes described in U.S. Patent 2,995,436, and U.S. Patent 3,189,433 (application 201,269) to Hollingsworth et al.

We have now made the surprising discovery that a defluorination feed material comprising a mixture of fluorine-containing phosphate rock, phosphoric acid and other defluorinating reagents can be successfully defluorinated at a temperature above about 2000° F. without prior nodulization of the non-agglomerated feed material and without disruption of the defluorinating process due to the formation of large lumps of the feed material in the calcination apparatus. Moreover, we have found that, assisted by proper preparation of the feed material, it is not only possible to effect defluorination of a non-agglomerated phosphate rock feed material but that it is also possible to effect agglomeration or nodulization of the feed material so that the average particle size of the product is several times larger than the average particle size of the feed material. As a result of these discoveries we have developed a new process for producing an agglomerated and defluorinated phosphate product from a non-agglomerated phosphate rock feed material.

In the preferred embodiment of our new process for agglomerating and defluorinating a non-agglomerated phosphate rock feed material the fluorine-containing phosphate rock having a particle size of less than 10 mesh (Tyler Standard) is mixed with phosphoric acid to effect at least partial reaction between the phosphate rock and phosphoric acid while maintaining the temperature of the reaction mixture below about 400° F., and preferably below about 300° F. The moisture content of the reaction mixture is advantageously adjusted so that it contains not more than about 6%, and preferably between about 0.5 and 4%, by weight of moisture, and then the partially reacted, unagglomerated feed material is introduced into a fluidized bed maintained at a temperature sufficient to substantially complete the reaction between the phosphoric acid and the fluorine-containing phosphate rock. As the reaction between the phosphate rock and phosphoric acid in the feed material proceeds to completion the particles of feed material pass through a tacky phase, and as a result of physical contact between the tacky particles and other particles in the fluidized bed the particles tend to agglomerate and thus increase in size. The agglomerated feed particles are then subjected to calcination in a fluidized bed maintained at a temperature of at least about 2000° F., and preferably at a temperature of between about 2200° and 2700° F. to effect further agglomeration of and to effect defluorination of the phosphatic feed material. Upon completion of the defluorination reaction a defluorinated and agglomerated phosphate rock product having a particle size appreciable larger than the non-agglomerated feed material is recovered.

The fluorine-containing, non-agglomerated feed material employed in the practice of our invention comprises essentially a mixture of phosphate rock and phosphoric acid, and the reaction product of this mixture. Other reagents for promoting defluorination and for improving the phosphate availability of the defluorinated product, such as soda ash, potash, lime and the like, may be included in the feed material mixture as the composition of the phosphatic raw material and the desired characteristics of the defluorinated product dictate, and a particularly advantageous feed material formulation useful in the practice of our invention is described in U.S. Patent 2,995,437 to Hollingsworth. Phosphate rock having a particle size of less than about 10 mesh, and preferably in the range of about 16 mesh to 100 mesh (Tyler Standard), is intimately mixed with the phosphoric acid and other reagents, if any, in conventional mixing apparatus. The order of addition of phosphoric acid and other reagents to the phosphate rock is not of critical importance. However, experience has shown that when the phosphoric acid is mixed with the phosphate rock prior to the addition of the other reagent or reagents thereto, the resulting defluorination feed material is less hygroscopic and consequently is easier to handle and to store, and in addition less dust will be formed in the subsequent calcination operation, and for these reasons it is preferred that the acid be mixed with the rock prior to the addition of the other reagents thereto.

When the phosphoric acid is added to the phosphate rock, the rock and the acid commence to react with each other. However, for reasons that will subsequently be made clear the reaction between the rock and the acid preferably is not permitted to proceed to completion at this time, and we have found that the reaction between the rock and the acid will not be complete if the temperature of the feed mixture is not allowed to exceed about 400° F. and preferably is maintained below about 300° F. Moreover, we have found that, in order to avoid problems encountered in the storage and handling of a wet, sticky feed material and to reduce fuel consumption in the subsequent defluorination operation, the moisture content of the feed mixture advantageously should be less than about 6%, and preferably is less than about 4%, by weight of the mixture, and as a consequence it is our usual practice to dry the feed mixture to reduce the moisture content to below the aforementioned level. The drying operation is advantageously carried out in a conventional rotary dryer, and as noted the temperature of the feed mixture should not be allowed to exceed 400° F., and preferably should be maintained within the range of about 200° to 300° F., during the drying operation in order to avoid completion of the reaction between the rock and the acid. The dried feed preferably contains between about 0.5 and 4%, and advantageously between about 1 and 2%, by weight of moisture. The feed material is not in any way deliberately agglomerated or nodulized during the course of the mixing and drying operations, and if properly prepared the particle size of the feed material is approximately the same as that of the phosphate rock constituent thereof despite unintentional changes in the size of individual particles taking place during the aforementioned preparatory operations.

The non-agglomerated feed material is introduced into a fluidized bed maintained at a temperature at least sufficient to effect agglomeration of the feed particles, and then the agglomerated feed material is subjected to calcination in the same or in another fluidized bed at a temperature of at least 2000° F. in order to effect defluorination of the phosphatic material. The agglomeration operation and the defluorination operation can be carried out as two separate steps in separate fluid bed reactors, or the two operations can be carried out at the same time in a single fluid bed reactor. If the agglomeration and defluorination operation are carried out together in a single fluid bed reactor the prevailing temperature of the fluidized bed maintained in the reactor is, of necessity, above the temperature sufficient to effect agglomeration of the particles. However, if the two operations are carried out in separate fluid bed reactors, the prevailing temperature of fluid bed maintained in the first reactor merely needs to be sufficient to effect agglomeration of the feed material, and this temperature will depend on the physical condition of the feed material.

That is to say, if the feed material is prepared in a manner such that the initial reaction between the particles of phosphate rock and the phosphoric acid is substantially complete prior to introduction of feed into the first fluid bed reactor, the agglomeration of the feed material is effected mainly by the sintering together of individual particles in the fluid bed that commences to take place when the particles are heated to above about 1500° F. On the other hand, if, as in the preferred practice of our invention, the initial reaction between the phosphate rock particles and phosphoric acid is not complete, the agglomeration of the feed material is attributable mainly to the fact that the particles pass through a tacky or semi-fluid phase as the reaction proceeds to completion, and as a consequence of their tackiness the particles tend to stick together and thus increase in size. The reaction between the phosphate rock and phosphoric acid constituents of the particles will proceed to completion at a temperature above about 500° F., but for best results the temperature of the fluidized bed maintained in the first of the two separate reactors advantageously is at least about 1000° F. and preferably is about 1300° F.

In any case the particles of feed material introduced into the fluid bed are raised very rapidly to the prevailing temperature of the bed. As the temperature of the individual particles of feed material increases, the reaction between the incompletely reacted phosphate rock and phosphoric acid constituents of the particles proceeds to completion so that the particles pass through the aforementioned tacky or semi-fluid phase, and when heated above 1500° F. the particles acquire the aforementioned tendency to sinter together. The feed particles come into frequent and repeated contact with other particles in the fluidized bed, and as a result of their tackiness and/or their tendency to sinter together the particles tend to agglomerate to form larger particles, the average particle size of the agglomerated feed material being in the order of two or three times that of the non-agglomerated feed. The increase in particle size due to the agglomeration in the fluidized bed of the initially non-agglomerized feed material is an important feature of our process whether the agglomeration takes place before the defluorination operation or simultaneously with the defluorination of the feed material.

Some defluorination of the feed material will occur at temperatures below about 2000° F. However, in order to obtain a product suitable for use as an animal feed supplement, the material must be heated to a temperature above 2000° F., and preferably at a temperature of between about 2200° and 2700° F., for an appreciable length of time. The length of time required to effect defluorination will depend on the composition of the feed material and the prevailing temperature in the fluidized bed, the average retention time of the particles in the bed being generally in the order of 1 to 2 hours. The calcined product recovered from the high temperature fluid bed reactor is an agglomerated and defluorinated phosphate material having a phosphorus to fluorine weight ratio of at least 100.

Our new process will be better understood from the following description thereof in conjunction with the accompanying drawing of which—

Figure 2:
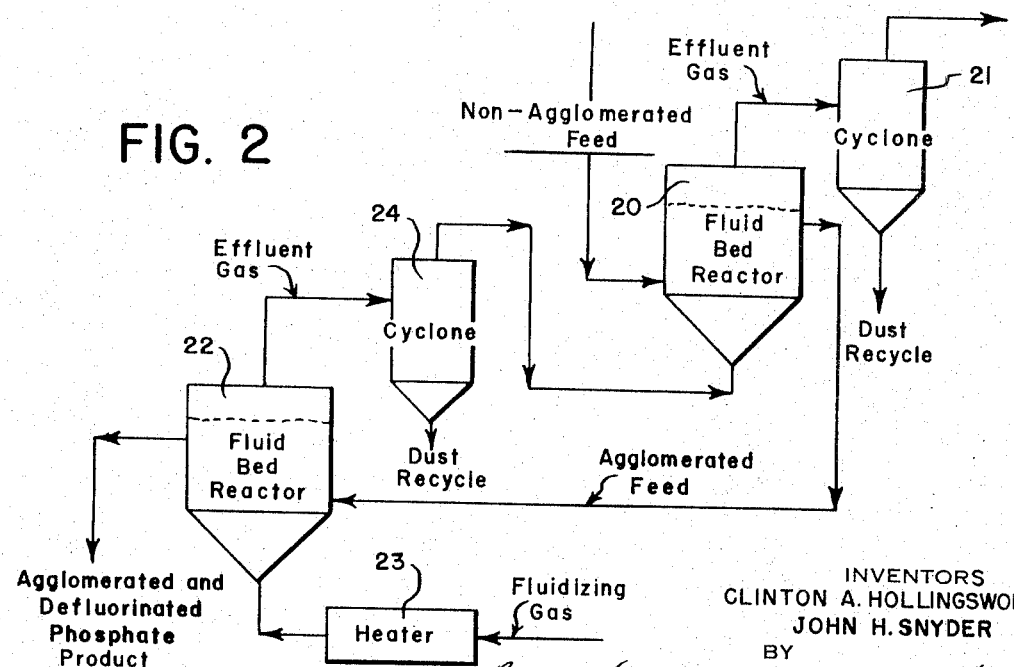

FIG. 1 is a schematic flow sheet of our process in which one fluid bed is employed for both agglomerating and defluorinating the phosphatic feed material, and FIG. 2 is a schematic flow sheet of the process employing two fluid bed reactors in the first of which the initially non-agglomerated feed material is agglomerated and in the second of which the agglomerated feed material is defluorinated.

In the advantageous embodiment of our new process shown schematically in FIG. 1, phosphate rock from storage container 10, phosphoric acid from storage container 11 and other defluorinating reagents, if any, from storage container 12 are thoroughly mixed and partially reacted with each other in conventional mixing apparatus 13. The partially reacted mixture is then dried, if desired, in dryer 14 to reduce the moisture content thereof to below about 6%, and preferably below about 4%, by weight of the mixture. The dry mixture is then screened, if desired, in screen 15 to remove oversize particles from the feed material. The initial particle size of substantially all of the phosphate rock is preferably less than about 10 mesh (Tyler Standard), and, although some unintentional changes in particle size may take place in the course of the mixing and drying operations, very little actual agglomeration of the particles occurs particularly if the temperature of the mixture in the mixer 13 and in the dryer 14 is maintained below 400° F. during the mixing and drying of the feed material. The dry, partially reacted feed material thus obtained is an essentially non-agglomerated non-hygroscopic mass of discrete particles of approximately the same size as the original particles of the phosphate rock constituent of the feed mixture.

The non-agglomerated feed material is introduced into a fluidized bed of phosphatic particles established in a conventional fluidized bed reactor 16, preferably below the surface of the bed. Fluidizing gas in introduced into the bottom portion of the reactor 16 to maintain the bed of phosphate particles in the desired fluidized condition, the fluidizing gas being heated externally by means of conventional heating apparatus 17 and/or in situ in the reactor by the combustion of fuel gas or the like so that the prevailing temperature within the reactor 16 is maintained at at least 2000° F., and preferably between about 2200° and 2700° F. The small particles of feed material quickly reach the prevailing temperature within the fluid bed, and as the particles are heated, the reaction between the phosphate rock, phosphoric acid and other constituents thereof proceeds to completion thereby causing the particles to pass through a tacky or sticky phase. The tacky particles tend to agglomerate to form larger particles, and as previously described the hot particles tend to sinter together, so that the average particle size of the agglomerated feed material is approximately 2 to 3 times that of the feed material introduced into the reactor 16. In addition, the fluorine content of the particles is reduced to less than about 0.2%, and preferably to about 0.1%, by weight, when calcined at the prevailing temperature within the bed so that an agglomerated and defluorinated phosphate product having a phosphorus to fluorine weight ratio of at least 100 is recovered from the reactor 16. The effluent gas from the reactor 16 containing the fluorine removed from the phosphatic feed material is introduced into a conventional cyclone 18 where dust particles (that is, fine particles of the phosphatic material that are entrained in the effluent gas) are removed and advantageously are recycled through the process or blended with the product or used as a separate product, depending on the fluorine content of the dust. The dust-free effluent gas from the cyclone 18 is then advantageously treated to recover the fluorine content thereof.

In the embodiment of our new process shown in FIG. 2, the non-agglomerated feed material is first agglomerated and then defluorinated in separate fluid bed reactors. In this embodiment, the prepared, non-agglomerated feed material is introduced into a conventional fluid bed reactor 20 containing a fluidized bed of phosphatic particles that is maintained at a temperature of at least about 1000° F., and preferably at a temperature of about 1300° F., by hot fluidizing gas advantageously introduced into the bottom portion of the reactor 20, the gas being heated externally and/or in situ in the reactor 20. The particles of phosphatic feed material quickly reach the prevailing temperature of the bed within the reactor 20, and as the reaction between the phosphate rock, phosphoric acid and other constituents of the particles proceed to completion the particles tend to agglomerate to form larger particles as previously described. The effluent gas from the reactor 20 is introduced into a conventional cyclone 21 where the dust particles are removed therefrom and advantageously recycled to the beginning of the process. The dust-free effluent gas from the cyclone 21 is then advantageously treated to recover the fluorine content thereof.

The agglomerated feed material from the first fluid bed reactor 20 is introduced while still hot (say at a temperature of 1200° F.) into the second fluid bed reactor 22 in which is contained a fluidized bed of phosphatic particles maintained at a temperature of at least about 2000° F., and preferably at least about 2200° F. After an average retention time of approximately 1 to 2 hours in the reactor 22, an agglomerated and defluorinated phosphate product having an average particle size of from 2 to 3 times that of the initial feed material and a phosphorus to fluorine weight ratio of at least 100 is recovered. The fluidizing gas introduced into the bottom portion of the fluid bed reactor 22 may be heated externally by means of conventional heating apparatus 23 and/or may be heated in situ in the reactor 22 by the combustion of fuel gas or the like therein. Moreover, the fluidizing gas may be brought into heat exchange relationship with the hot phosphatic product to partially cool the product and partially pre-heat the fluidizing gas. The effluent gas from the reactor 22 containing the fluorine removed from the phosphatic material is introduced into a conventional cyclone 24 where dust particles are removed from the gas and advantageously recycled to the start of the process. The dust-free effluent gas from the cyclone 24 may be wasted, but preferably it is introduced into the bottom portion of the first fluid bed reactor 20 in order to fluidize and heat the bed of phosphatic particles therein.

The following specific examples are illustrative but not limitative of the practice of our invention:

*Example I*

Non-agglomerated feed material was prepared by mixing phosphate rock substantially all of which had a particle size of less than 10 mesh (Tyler Standard) with the relative quantities of wet process phosphoric acid and soda ash specified in U.S. Patent 2,995,437. The phosphate rock, phosphoric acid and soda ash were thoroughly blended in a pug mill and then were dried in a rotary dryer at a temperature of between 200° and 300° F. to obtain a dry, non-agglomerated phosphatic feed material which contained about 1.5% moisture and had a particle size such that about 98% thereof was less than 10 mesh and about 23% was less than 35 mesh. The non-agglomerated feed material was introduced at an average rate of about 710 pounds per hour into the lower portion of a fluidized bed of phosphatic particles established in a fluid bed reactor of conventional design. The average depth of the fluidized bed was 81 inches and the prevailing temperature within the bed was about 2470° F. An agglomerated and defluorinated phosphatic product (referred to as "clinker") was withdrawn from the reactor at an average rate of about 610 pounds per hour and about 50 pounds of dust per hour were removed from the effluent gas by the cyclone. The particle size of the clinker had increased relative to the feed material so that approximately 29% thereof was greater than 10 mesh and approximately 98% was greater than 35 mesh. The combined weight of the agglomerated clinker and the dust recovered at the cyclone was about 90% that of the feed material introduced into the reactor, the combined product having an average fluorine content of 0.094% and containing about 99.7% of the phosphorus initially present in the feed material.

*Example II*

The feed material had a particle size such that substantially all of the material was less than 10 mesh and about 56% was less than 35 mesh when prepared as described in Example I. The non-agglomerated feed material was introduced at an average rate of about 830 pounds per hour into the lower portion of a fluidized bed of phosphatic material established in the fluid bed reactor of Example I. The prevailing temperature within the bed was maintained at about 2390° F. The defluorinated clinker product recovered from the fluid bed reactor contained about 0.09% by weight of fluorine and had a particle size such that about 87% was more than 10 mesh and substantially all of the product was more than 35 mesh.

The operating data and the results obtained for the foregoing examples are set forth in the following table:

|  | Example I | Example II |
|---|---|---|
| Feed rate, lbs./hr | 710 | 833 |
| Moisture, percent | 1.5 | 0.5 |
| Bed Temperature, °F | 2,470 | 2,392 |
| Clinker, lbs./hr | 607 | 658 |
| Dust, lbs./hr | 51 | 93 |
| $P_2O_5$ recovery, percent | 99.7 | 100 |
| Chemical Analysis: | | |
| Feed: | | |
| Percent P | 16.45 | 15.93 |
| Percent F | 3.40 | 3.40 |
| Clinker: | | |
| Percent P | 18.43 | 18.27 |
| Percent F | 0.06 | 0.09 |
| Dust: | | |
| Percent P | 17.96 | 17.68 |
| Percent F | 0.48 | 0.75 |

|  | Feed | Clinker | Feed | Clinker |
|---|---|---|---|---|
| Screen Analysis: | | | | |
| +6 | 1.5 | 4.1 |  | 43.0 |
| −6+10 | 0.7 | 25.1 |  | 44.2 |
| −10+35 | 75.2 | 68.5 | 44.1 | 11.2 |
| −35+65 | 17.9 | 1.9 | 39.1 | 1.6 |
| −65 | 4.7 | 0.4 | 16.8 |  |

We claim:
1. In a method for the defluorination of phosphate rock which involves forming a mixture of the fluorine containing phosphate rock with phosphoric acid, effecting reaction of the mixture of phosphate rock and phosphoric acid to obtain a feed material, subjecting the feed material to calcination in a fluidized bed maintained at a temperature of at least about 2000° F. to defluorinate the phosphoric feed material and recovering the defluorinated product therefrom, the improvement in combination therewith comprising:
preparing the fluorine containing phosphate rock to provide a particle size of less than about 10 mesh (Tyler Standard) prior to the forming of the mixture with the phosphoric acid;
forming a non-agglomerated feed of the mixture of the phosphate rock and phosphoric acid;
introducing the non-agglomerated feed material into a fluidized bed maintained at a temperature sufficient to cause the particles to tend to stick together and as a consequence of physical contact between said particles and other particles in such fluidized bed to agglomerate and thereby increase in size;
subjecting the agglomerated particles to calcination as aforesaid and recovering a defluorinated and agglomerated phosphate rock product having a particle size appreciably larger than the non-agglomerated feed material.

2. A method according to claim 1 wherein the non-agglomerated feed is partially reacted prior to its introduction to the fluidized bed in which the temperature is maintained at above about 2000° F. whereby the agglomeration and calcination of the feed are accomplished in the fluidized bed.

3. A method according to claim 1 wherein the non-agglomerated feed is partially reacted prior to its introduction to the fluidized bed in which the temperature is maintained at above about 1000° F. thereby agglomerating the feed, and thereafter the thus agglomerated feed is treated in a second fluidized bed at a temperature of above about 2200° F. to calcinate the agglomerates thereby defluorinating the phosphate rock.

4. A method according to claim 1 wherein the non-agglomerated mixture of the phosphate rock and phosphoric acid is formed at a temperature below about 400° F., and the feed thus formed is adjusted for its moisture content to below about 6% by weight.

5. A method according to claim 4 wherein the non-agglomerated feed is agglomerated in the fluidized bed maintained at a temperature in the range between 2200° F. and 2700° F. thereby defluorinating the feed.

6. A method according to claim 4 wherein the feed is agglomerated in the fluidized bed maintained at a temperature in the range of about 1000° F. and about 1300° F. and thereafter is subjected to calcination in a second fluidized bed at a temperature in the range between 2200° F. and 2700° F. to defluorinate the phosphate rock.

References Cited

UNITED STATES PATENTS 3,189,433  6/1965  Hollingsworth et al. ____ 71—44

FOREIGN PATENTS 206,473  2/1957  Australia.

DONALL H. SYLVESTER, *Primary Examiner.*

S. LEON BASHORE, *Examiner.*

R. BAJEFSKY, *Assistant Examiner.*